United States Patent
Gromadskyi et al.

(10) Patent No.: US 11,559,926 B2
(45) Date of Patent: Jan. 24, 2023

(54) METHOD OF PRODUCING SEPARATOR PLATES BY COMPACTION AND A PRODUCTION FACILITY

(71) Applicant: BLUE WORLD TECHNOLOGIES HOLDING APS, Aalborg Ost (DK)

(72) Inventors: Denys Gromadskyi, Ellidshoj (DK); Jakob Bork, Stovring (DK); Mads Bang, Stovring (DK); Peter Schionning Aasholm, Bronderslev (DK)

(73) Assignee: BLUE WORLD TECHNOLOGIES HOLDING APS, Aalborg Øst (DK)

( * ) Notice: Subject to any disclaimer, the term of this patent is extended or adjusted under 35 U.S.C. 154(b) by 0 days.

(21) Appl. No.: 17/635,171

(22) PCT Filed: Aug. 7, 2020

(86) PCT No.: PCT/DK2020/000243
§ 371 (c)(1),
(2) Date: Feb. 14, 2022

(87) PCT Pub. No.: WO2021/028000
PCT Pub. Date: Feb. 18, 2021

(65) Prior Publication Data
US 2022/0314502 A1  Oct. 6, 2022

(30) Foreign Application Priority Data
Aug. 14, 2019 (DK) .............................. PA2019 70519

(51) Int. Cl.
*B29C 43/00* (2006.01)
*H01M 8/0226* (2016.01)
(Continued)

(52) U.S. Cl.
CPC .............. *B29C 43/003* (2013.01); *B29B 7/90* (2013.01); *B29B 11/10* (2013.01); *B29B 11/12* (2013.01);
(Continued)

(58) Field of Classification Search
CPC ....... B29C 43/003; B29C 43/02; B29C 43/24; B29C 43/36; B29C 43/44; B29C 43/006;
(Continued)

(56) References Cited

U.S. PATENT DOCUMENTS

| 4,927,909 A | 5/1990 | Wadhwa et al. |
| 5,945,233 A | 8/1999 | Onorato et al. |

(Continued)

FOREIGN PATENT DOCUMENTS

| EP | 1394878 A1 | 3/2004 |
| EP | 1758185 B1 | 10/2018 |

(Continued)

OTHER PUBLICATIONS

Arkadani, Polytetrafluoroethylene Paste Extrusion: A Fibrillation Model and Its Relation to Mechanical Properties, Intern. Polymer Processing XXVIII (2013) 3.
(Continued)

*Primary Examiner* — Stella K Yi
(74) *Attorney, Agent, or Firm* — Brooks Kushman P.C.

(57) ABSTRACT

A method for producing a separator plate, where thermoplastic polymer material and a powder of electro-conductive filler, ECF is kneaded at a kneading temperature above a glass transition temperature for the thermoplastic polymer material but below a melting temperature for the thermoplastic polymer material in order to provide a malleable but not molten compound and for causing fibrillization in the thermoplastic polymer material prior to hot-compacting the
(Continued)

sheet in a press-form to form a separator plate. A production facility for practicing the method is also disclosed.

20 Claims, 4 Drawing Sheets

(51) Int. Cl.
    *B29B 7/90* (2006.01)
    *B29C 43/24* (2006.01)
    *B29C 43/02* (2006.01)
    *B29C 43/36* (2006.01)
    *B29B 11/10* (2006.01)
    *B29B 11/12* (2006.01)
    *B29C 43/44* (2006.01)
    *B29L 31/34* (2006.01)
    *B29K 101/12* (2006.01)

(52) U.S. Cl.
    CPC .............. *B29C 43/02* (2013.01); *B29C 43/24* (2013.01); *B29C 43/36* (2013.01); *B29C 43/44* (2013.01); *H01M 8/0226* (2013.01); *B29K 2101/12* (2013.01); *B29K 2995/0005* (2013.01); *B29L 2031/3468* (2013.01)

(58) Field of Classification Search
    CPC ... B29C 2043/144; B29C 43/34; B29B 11/12; B29B 11/10; B29B 7/90
    See application file for complete search history.

(56) References Cited

U.S. PATENT DOCUMENTS

| | | | |
|---|---|---|---|
| 6,042,968 | A | 3/2000 | Onorato et al. |
| 6,180,275 | B1 | 1/2001 | Braun et al. |
| 6,544,680 | B1 | 4/2003 | Takano et al. |
| 6,803,139 | B2 | 10/2004 | Saito et al. |
| 7,128,996 | B2 | 10/2006 | Nishihata et al. |
| 7,758,783 | B2 | 7/2010 | Shi et al. |
| 2002/0055030 | A1 | 5/2002 | Okumura et al. |
| 2002/0177030 | A1 | 11/2002 | Inagaki et al. |
| 2005/0042496 | A1 | 2/2005 | Bisara et al. |
| 2009/0160105 | A1 | 6/2009 | Jaeckel et al. |
| 2012/0031992 | A1 | 2/2012 | Mediavilla |
| 2012/0115050 | A1 | 5/2012 | Kim et al. |
| 2013/0216744 | A1 | 8/2013 | Liao |
| 2014/0284269 | A1 | 9/2014 | Kharul et al. |
| 2016/0190625 | A1 | 6/2016 | Hsu et al. |
| 2017/0098826 | A1 | 4/2017 | Mitchell et al. |
| 2018/0358630 | A1 | 12/2018 | Woo et al. |
| 2019/0260037 | A1 | 8/2019 | Gromadskyi |
| 2020/0365914 | A1 | 11/2020 | Yasuda et al. |

FOREIGN PATENT DOCUMENTS

| | | |
|---|---|---|
| FR | 2881482 A1 | 8/2006 |
| FR | 3009613 A1 | 2/2015 |
| WO | 2006095821 | 9/2006 |
| WO | 2013 103748 A1 | 7/2013 |
| WO | 2014 033206 A1 | 3/2014 |
| WO | 2018072803 A1 | 4/2018 |
| WO | 2018179633 A1 | 10/2018 |
| WO | 2019039214 A1 | 2/2019 |

OTHER PUBLICATIONS

International Search Report for PCT/DK2020/000243, Prepared by the Nordic Patent Institute, dated Nov. 4, 2020, 3 pages.
DOE Technical Targets for Polymer Electrolyte Membrane Fuel Cell Components, download from https://www.energy.gov/eere/fuelcells/doe-technical-targets-polymer-electrolyte-membrane-fuel-cell-components, retrieved Feb. 22, 2022.

METHOD OF PRODUCING SEPARATOR PLATES BY COMPACTION AND A PRODUCTION FACILITY

CROSS-REFERENCE TO RELATED APPLICATION

This application is the U.S. national phase of PCT Application No. PCT/DK2020/000243 filed on Aug. 7, 2020, which claims priority to DK Patent Application No. PA2019 70519 filed on Aug. 14, 2019, the disclosures of which are incorporated in their entirety by reference herein.

FIELD OF THE INVENTION

The present invention relates to a method of producing separator plates by hot compaction, especially a continuous process. It also relates to a production facility with a press-form.

BACKGROUND OF THE INVENTION

Bipolar plates (BPPs), for example produced by combining two monopolar plates (MPP), are key components of some type of fuel cells, as they play a role of separators for single membrane-electrode assemblies. Also, they play a role in electrically connections for providing the required voltage of the stack.

As high temperature and strong acidic media limit utilization of metallic BPPs due to their tendency to corrode, carbon materials, especially graphite, are attractive as alternatives to metal.

U.S. Pat. No. 6,544,680 discloses moulded separator plates with carbon and PPS but with the addition of a thermosetting resin. U.S. Pat. No. 6,803,139 discloses moulded separator plates with carbon and a thermoplastic, for example polyphenylene sulfide (PPS), but with the addition of carbodiimide. EP1758185 discloses moulded separator plates with 84% carbon, 2% PTFE, 14% epoxy that is cured in the hot press. Polyphenylene sulfide (PPS) or Polytetrafluoroethylene (PTFE), also called Teflon, are mentioned as thermoplastic resins but not exemplified.

The US Department of Energy (DOE) has set a 2020 target for polymer electrolyte membrane fuel cell components, which is described on the Internet site https://www.energy.gov/eere/fuelcells/doe-technical-targets-polymer-electrolyte-membrane-fuel-cell-components. The 2020 target requires a specific resistance of less than 0.01 $\Omega \cdot cm^2$ and a flexural strength more than 25 MPa. In order to reach this target of low resistance, the amount of graphite in the BPP composition should be rather high, especially more than 70 wt. %, and its particles should be uniformly distributed in the polymer binder. This can be achieved, for example, via grinding raw materials to micron or submicron dimensions with further intensive mixing the grinded powders.

A grinding process is disclosed in WO2018/072803 by SerEnergy, also disclosing use of PTFE for bonding powder of graphite and PPS into BPPs. In this disclosure, isopropanol plays important role as surfactant in the production process. However, in practice, it has turned out that iso-propyl alcohol is likely to provoke agglomeration of PTFE particles in the aqueous dispersion during mixing, which may be desired in some cases but which requires a relatively long time of stirring, which is undesirable from a commercial perspective, as it prolongs the production process. Using iso-propanol has another disadvantage in that work with iso-propanol requires strict safety rules and permanent control, especially at elevated temperatures, due to its high flammability as its flash point is only 12° C.

It would therefore be desirable to provide a method for production of separator plates, in which the use of iso-propanol can be avoided, while keeping the advantage of moulding of a pliable particular material.

In order for making fuel cells competitive to other energy sources for especially vehicles, the cost according to the DOE 2020 target should be below than 3 USD/kW. For reducing costs in the production of separator plates for fuel cells, scaling-up and accelerating of the manufacturing processes is vital.

U.S. Pat. No. 7,758,783 discloses a continuous process for producing separator plates. Carbon is dropped onto a conveyor, polymer sprayed on top of it, and the mix pressed into plates through a calendering process.

US2005/0042496 discloses a continuous process in which polymer is blended with a filler, for example graphite, kneaded and extruded before transferred into a form, in which it is compacted, for example into a separator plate.

US2018/358630A1 discloses compression moulding of a bipolar plate for a fuel cell, in which a conductive composition is used with carbon powder and the polymer resin, for example polyphenylene PPS and/or PTFE. EP1394878A1 discloses a fuel cell separator moulded from a blend of polymer resin and carbon and a filler. WO2019/039214A1 discloses a fuel cell separator that is obtained by impregnating a porous sheet. WO2018/179633A1 discloses a hydraulic moulding press system. US2013/216744A1 discloses a press moulding system for plastic bonded fiber layers.

In particular for proton exchange membrane (PEM) fuel cells, there are two main cost contributors, namely platinum-containing electrodes and the bipolar plates (BPPs). It would be desirable to reduce the costs for production in order to be within the targets as set in the USA DOE's 2020 program.

DESCRIPTION/SUMMARY OF THE INVENTION

It is therefore the objective of the invention to provide an improvement in the art. In particular, it is an objective to provide an improved method for production of separator plates, especially BPPs. Specific objectives are found among: a production method free of isopropanol, a continuous production, a high speed production, a waste-free production. One or more of these objectives are achieved with a method of production for separator plates as explained in the following, for example for fuel cells.

The method of producing a separator plate comprises a mixing stage for mixing thermoplastic polymer material and a powder of electro-conductive filler, ECF, for providing a compounded polymer matrix for a separator plate, for example MPP or BPP.

Examples of such ECF are amorphous carbon, carbon black, carbon fibers, carbon nanotubes, graphene and/or graphite. For example, the ECF comprises a dominant concentration of graphite and/or carbon black. Typically, the size of the grains in the carbon black powder is in the sub-micron range, for example with an average size of between 20 and 100 nm. For graphite powder, the average grain size is in the range of 0.1 to 20 microns, typically however, in the range of 0.25 to 5 microns. When carbon black is used, optionally, carbon fibers, carbon nanotubes and/or graphene are added, typically in small quantities.

This further increases the electrical conductivity of the separator plates, in particular MPPs or BPPs.

In a subsequent kneading stage, the mix is kneaded at a kneading temperature above a glass transition temperature for the thermoplastic polymer material but below a melting temperature for the thermoplastic polymer material in order to provide a malleable but not molten compound. The compound that results from the mix is kneaded for a sufficiently long kneading time at the kneading temperature to cause fibrillization in the thermoplastic polymer material. The fibrillization is a useful aspect of the invention.

Optionally, the thermoplastic polymer material is a mix of at least two thermoplastic polymers, which are mixed with the ECF in the mixing stage and then kneaded in the kneading stage.

In concrete embodiments, the at least two thermoplastic polymers are selected such that the highest of the glass transition temperatures for the at least two thermoplastic polymers is below the lowest of the melting temperatures for the at least two thermoplastic polymers. In the kneading stage, the temperature of the mix is adjusted to a kneading temperature that is above the highest of the glass transition temperatures for the at least two thermoplastic polymers but below the lowest of the melting temperatures for the at least two thermoplastic polymers in order to knead a malleable but not molten compound. Thus, in order for all the polymers to be properly malleable in the kneading stage, they should be kept at a kneading temperature above their glass transition temperatures and below their melting temperatures.

In addition, it is useful if at least one of the polymers should be capable of proper fibrillization, and the mix should be kneaded for a sufficiently long kneading time at the kneading temperature to cause fibrillization in at least one of the at least two thermoplastic polymers.

For example, as will be explained in more detail below, kneading of a mix of polyphenylene sulfide (PPS) and polytetrafluoroethylene (PTFE) leads only to substantial fibrillization of PTFE, which is due to very different physical properties between these two polymers. However, each of the two polymers contributes with its advantageous specific properties, which will be more apparent below.

In the kneading stage, the compound is not yet portioned into quantities for a separator plate and not yet formed into a sheet but remains as a bulk. From the kneading stage, the compound is extracted, typically in portions for the separator plate production, and then formed into a proper shape. For example, the extraction is made by extrusion of the kneaded compound, optionally onto a conveyor for transport of the extruded compound to subsequent production stages.

After the kneading stage, in a subsequent pre-pressing stage, the malleable and pliable compound is pre-pressed into a sheet. Optionally, the pre-pressing stage comprises a first compression stage that is decreasing the height of the compound, for example extruded compound, by a top-pressing conveyor with decreasing height in the direction of transportation such that the height of the kneaded compound is decreased by its way through top-pressing conveyor. Alternatively, or in addition, the pre-pressing stage comprises a calendering stage that comprises press-rolling the compound, for example extruded compound, by multiple subsequent calendering stations with decreasing gap height in these subsequent calendering stations such that the height of the extruded mix is decreased by its transport through each of the gaps of the calendering stations.

Optionally, the shaping of the sheet into desired dimensions for the separator plate comprises removal of surplus-material from edges of the sheet, for example by cutting. Advantageously, the method comprises recycling the removed surplus-material into the mixing stage or into the kneading stage for production of further subsequently produced separator plates. This way, the surplus-material is not wasted.

After the pre-pressing stage, the sheet is subject to a press-moulding stage for hot-compacting the sheet in a press-form to form a separator plate at a press-moulding temperature above the glass transition temperature for the thermoplastic polymer material but below the melting temperature for the thermoplastic polymer material in order to compact the compound in malleable but not molten state. The temperature of the formed separator plate is then reduced to under the glass transition temperature for the thermoplastic polymer material while under pressure in the press-form to cause rigid solidification, before the rigidly solidified separator plate is removed from the press-form.

For the specific embodiments, in which the thermoplastic polymer material comprises at least two thermoplastic polymers, the press-moulding temperature is adjusted to above the highest of the glass transition temperatures for the at least two thermoplastic polymers but below the lowest melting temperature for the at least two thermoplastic polymers. Thus, all polymers are kept at a kneading temperature above their various glass transition temperatures in order to be malleable and below their various melting temperatures. The temperature of the formed separator plate is then reduced to under the lowest of the glass transition temperatures for the at least two thermoplastic polymers while under pressure in the press-form in order to cause rigid solidification of all of the at least two thermoplastic polymers prior to removing the rigidly solidified separator plate from the press-form.

Optionally, in the hot press-moulding stage, the sheet is pressed by the press-form at a pressure of between 75 and 375 MPa.

For example, the press-form comprises two oppositely arranged shaping press-plates with a space in between for the sheet. If the press-form has a good capability of taking up heat from the compound, the take-up of thermal energy can be regulated to a speed causing cooling of the press-moulded separator plate to below the glass temperature during press-moulding and causing rigid solidification of the separator by cooling within a very short time, for example a time of less than five seconds, optionally less than two or even one second. Optionally, the press-plates have a thermal conductivity of more than 100 W/(m·K) and efficiently take-up thermal energy by the press-plates during press-moulding of the sheet.

Optionally, the two press-plates are supported and surrounded by a support frame, such that rims of the press-plates are abutting an inner wall of the support frame. Advantageously, the inner wall of the support frame, where the press-plates are abutting the support frame, is made of a material with a lower hardness than the press-plates. An advantage is minimization of mutual scratching of the press-plates and the support frame during moulding process and afterwards when the press-plates are disassembled for taking out the press-moulded separator plate after the moulding process.

In a practical embodiment, the press-plates are arranged for being compressed by force against a counterblock having larger volume and mass than the press-plates. Optionally, the press-form comprises elastic elements, such as springs, between the pair of shaping press-plates and the counter-block in order to prevent overload to the press-plates and the sheet and for allowing a gradual shaping of the sheet into an MPP despite high-speed press-moulding.

The production method as well as the described production facility with the various stages and the press-form is useful for separators in fuel cells, especially proton exchange membrane (PEM) fuel cells, for example high-temperature proton exchange membrane (HT-PEM) fuel cells. High-temperature PEM fuel cells have a great advantage as compared to low-temperature PEM fuel cells, namely the possible operation with impure hydrogen, e.g. reformate gas, due to the high tolerance to carbon monoxide therein. But relatively high working temperatures (120-200° C.) in combination with concentrated acid media inside the fuel cell lead to the necessity to use inert, thermally stable polymers for binding powdered or pelletized electro-conductive fillers (ECFs).

For example, the thermoplastic polymer material comprises or consists of thermoplastic polymer of a first group TP1 and thermoplastic polymer of a second group TP2. By selecting polymers from two different groups, physical parameters related to structural stability, toughness, and chemical inertness, among others, can be adjusted to yield an optimum thermoplastic polymer material for the separator plate. Characteristics of two suitable groups are explained in more detail below.

For example, the thermoplastic polymer of the first group TP1 is primarily used for creating structural stability, and the thermoplastic polymer of the second group TP2 is primarily used for toughness to prevent breaking. In order to create toughness of the compound material, the selected polymer from the second group should be fibrillizable by kneading.

As will be more apparent below, a combination of thermoplastic polymers has been found useful, wherein the group TP1 has a tensile elongation of less than 100%, and TP2 a tensile elongation of at least 100%.

The ratio between the polymer or polymers of TP1 and TP2 are adjusted for optimization. In some embodiments, the compound comprises more polymer of TP1 than polymer of TP2.

For the case that the final separator plate is should be used for HT-PEM fuel cells, both groups TP1 and TP2 should have melting points above 200° C.

Furthermore, it is advantageous, if the first type TP1 has a flexural strength higher than 100 MPa in order to provide good structural stability of the separator plate.

For the reasons of low electrical resistance, the concentration of ECF should be relatively high, for example more than 60% by weight, for example more than 70% by weight.

Specific criteria for BPPs are given by the USA DOE's 2020 target, implying that the BPPs should have a specific resistance of less than 0.01 Ω·cm2 and a flexural strength of more than 25 MPa, while also fulfilling the criteria to production costs below 3 USD/kW. These requirements need a careful selection of polymers as binders and improvements in production processes because low electrical resistance and high strength produced at low cost is a challenge.

In addition, especially for HT-PEM fuel cells, criteria for selection of polymers, apart from being thermoplastic, are not only thermal stability, but also chemical resistivity and good flexural strength.

A highly useful candidate as thermoplastic polymer is polyphenylene sulfide (PPS). However, polyether ether ketones (PEEK), polyetherimide (PEI), polysulfones (PSU), are useful alternatives. These polymers belong to a first group of polymers TP1, in short for thermoplastic polymers of the group 1. The polymers of group TP1 have high thermal stability, chemical resistivity and good flexural strength.

Advantageous characteristics for this group TP1 are found among the following

- a melting temperature higher than 200° C.;
- a continuous service temperature of at least 120° C.;
- a specific weight of less than 1.5 g/cm3;
- a tensile elongation lower than 100%, for example up to 80% or up to 50%;
- a flexural strength higher than 100 MPa;
- a shrinkage less than 2%.

Among these, the most important characteristics for the production are the high flexural strength, and in the case of use for a HT-PEM fuel cell also the relatively high continuous service temperature.

As an example, PPS is an advantageous binder for separator plates, especially MPPs and BPPs, because it is not dissolved in any solvent at temperatures below 200° C., and it has high melting point in the range of 271-292° C., which is depending of the degree of crystallinity and molecular weight. Its melting point is significantly higher than the operation temperatures of HT-PEM fuel cells, which is in the range of 120-200° C.

However, as it appears from Table 1 below, which outlines some important physical properties, these polymers of the group TP1 have a relatively low tensile elongation.

TABLE 1

| Mechanical and thermal properties of some thermoplastic polymers | | | | | | | | |
|---|---|---|---|---|---|---|---|---|
| | FEP | PCTFE | PEEK | PEI | PPS | PSU | PTFE | PVDF |
| Specific weight (g/cm³) | 2.12 | 2.10 | 1.30 | 1.27 | 1.30 | 1.24 | 2.16 | 1.78 |
| Tensile elongation (%) | 240 | 100 | 45 | 15 | 4.0 | 50 | 300 | 30 |
| Shrinkage (%) | 10 | 2.0 | 1.0 | 1.1 | 1.8 | 0.4 | 5.8 | 3.0 |
| Flexural strength (MPa) | no break | 66 | 165 | 145 | 125 | 108 | no break | 77 |
| Continuous service temperature (° C.) | 206 | 175 | 260 | 180 | 220 | 160 | 260 | 150 |
| Glass transition temperature (° C.) | 80 | 120 | 140 | 217 | 85 | 185 | 130 | −45 |
| Melting point (° C.) | 253 | 210 | 343 | 354 | 274 | 332 | 335 | 175 |

Low tensile elongation can be disadvantageous, as it implies that the material is relatively brittle. However, it is generally desired that the risk for breakage is minimized. This is a critical issue, especially for thin separator plates. In order to reduce the risk for breakage, it is desirable to find a viable technical solution.

Having regard to the physical properties of the polymers in Table 1, there are candidates with higher tensile elongation, namely ethylene tetrafluoroethylene (ETFE), fluorinated ethylene propylene (FEP), polychlorotrifluoroethylene (PCTFE), polytetrafluoroethylene (PTFE). In the following a second group of polymers will be defined and denoted TP2, in short for thermoplastic polymers of the group 2, to which these polymers belong. The polymers of the group TP2 have relatively high tensile elongation, and can be fibrillated, especially by kneading.

Advantageous characteristics for this group TP2 are among the following:
 a melting temperature higher than 200° C.;
 a continuous service temperature at least 120° C.;
 a tensile elongation higher than 100%, for example is in the range of 100% to 300% or in the range 200% to 300%;
 tendency for fibrillization by kneading.

Among these, the most important characteristics for the production is the relatively high tensile elongation and the ability for fibrillization by kneading. A tensile elongation in the range of 100% to 300% is multifold larger than the 4% for PPS.

Furthermore, the glass transition temperature of TP2 should lower than the melting temperature of the polymer of TP1 when used in combination.

In Table 1 above, there is also mentioned polyvinylidene fluoride (PVDF). This polymer has a melting point of 175° C., which is not so useful for HT-PEM fuel cells that work at a temperature up to 200° C. For this reason, this was not found a proper candidate for HT-PEM fuel cells.

Using both groups TP1 and TP2 of polymers in a mixture yields an advantage because their individual useful properties can be combined. As an example, a mix of PPS and PTFE can be used as a combined binder for the electroconductive filler. Especially, PTFE is highly advantageous over other thermoplastic binders when in combination with PPS due to through its high decomposition temperature (410° C.), inertness and other unique properties, including low coefficient of friction, high strength, toughness and self-lubrication.

An advantage of a mix of PPS and PTFE has been recognized in the prior art, for example in the above mentioned WO2018/072803 by SerEnergy. However, in order to reach the US DOE 2020 target, further improvements are necessary, especially with respect to improved physical properties and with respect to costs of production.

To achieve further improvements, group TP2 has been selected to contain polymers that can be fibrillized. Fibrillization improves the toughness of the material due to creation of fibrils. Reference is made to US2017/099826 for explanation of the fibrillization process where fibrils are produced in the polymer.

It is emphasized that the above mentioned polymers of TP1 have small tensile elongation, especially PPS, which is why they are not suitable for fibrillization in the production of low cost separator plates.

For the production, the following coarse production stages are explained in greater detail:
 the mixing procedure of TP1/TP2/ECF,
 the pre-forming procedure,
 the press-moulding procedure.

Although, optimally in combination, each of the procedural stages is also valuable each by itself and can be combined with other production methods in the prior art. For example, in the following, a press-form and a press-moulding procedure is explained with rapid cooling, which is useful also for other production methods, not necessarily mentioned herein.

Optionally, for a separator plate that is conductive, the material comprises a blend of powder containing
 at least 60% carbon powder, for example at least 70%,
 10-20% of polyphenylene sulfide, PPS, and
 0.05-18% PolyTetraFluoroEthylene, PTFE, for example 0.05-1% m optionally between 0.05-0.5% (end points of the interval excluded), such as 0.05%-0.4%, where all percentages by weight of the sum of the total weight of the compound.

In some embodiments, the production comprises a continuous sequence of production stages, the continuous sequence comprising in the following order:
 the kneading stage of the compound;
 in an extrusion stage extruding the compound after the kneading;
 the pre-pressing stage for pre-pressing the extruded compound into a sheet;
 shaping the sheet into desired dimensions for the separator plate;
 moving the shaped sheet into the press-form and hot-compacting the sheet in the hot press-moulding stage and cooling the sheet to under the glass temperature of the thermoplastic polymer while the sheet after forming of it into a separator plate remains in the press form, and then removing the separator plate from the press-form.

In some practical embodiments, the extrusion stage comprises extruding the compound onto a conveyor, and the pre-pressing stage comprises pre-pressing the extruded compound into a sheet while the sheet is being moved on the conveyor.

Optionally, the pre-pressing stage comprises a first compression stage that is decreasing the height of the extruded mix by an inclined top-pressing conveyor with decreasing height in the direction of transportation such that the height of the extruded mix is decreased by its way through top-pressing conveyor. Alternatively, or in addition, the pre-pressing stage comprises a calendering stage that comprising press-rolling the extruded mix by multiple subsequent calendering stations with decreasing gap height in subsequent calendering stations such that the height of the extruded mix is decreased by its transport through each of the gaps of the calendering stations.

Optionally, the shaping of the sheet into desired dimensions for the separator plate comprises removal of surplus-material from edges of the sheet, for example by cutting. Advantageously, the method comprises recycling the removed surplus-material into the mixing stage or into the kneading stage for production of subsequent separator plates. This way, the material is not wasted.

As already mentioned, raw materials are provided from a dispenser and mixed in a mixer, typically by stirring. For this process, different possibilities exist. Non-limiting examples of mixing procedures are as follows as A, B, and C:

A) a dry powder of electrical conductive filler (ECF) in mixed with a dry powder of thermoplastic polymer, for example a first thermoplastic polymer of the group TP1 and a second thermoplastic polymer of the group TP2; the kneading stage then comprises kneading the mixed dry powder into the compound at the kneading temperature.

B) a powder of electrical conductive filler (ECF) in mixed with a solution of thermoplastic polymer, for example a first thermoplastic polymer of the group TP1 and a second thermoplastic polymer of the group TP2; the mix is heated to a temperature above the boiling point of the solvent, causing evaporation of the solvent while stirring the solution, and the kneading stage comprises kneading the remaining mix into a compound after evaporation of the solvent. Optionally, the solvent is captured during evaporation and recycled in the process for subsequent mixing stages.

C) a powder of electrical conductive filler (ECF) in mixed with an aqueous dispersion containing thermoplastic polymer, for example a first thermoplastic polymer of the group TP1 and a second thermoplastic polymer of the group TP2; the mix is heated to a temperature above the boiling point of the water, causing evaporation of the water while stirring the dispersion; and the kneading stage comprises kneading the remaining mix into a compound after evaporation of the water and evaporation of other optional liquids in the dispersion, such as surfactants. Optionally, the water is captured during evaporation and recycled in the process for subsequent mixing stages For example, a quantity of deionized water is provided, typically with more water than powder when measured by weight; for example in a 1.5:1 mass ratio to the weight of the powder.

Optionally, the principles of these procedures can be combined. For example, an aqueous dispersion of a TP2 is mixed with a dry powder of ECF/TP1.

For the process B, a variety of solvents are available for dissolving the thermoplastic polymers. Exemplary solvents, especially for dissolving PPS, are 1-benzoylnaphtalene, 1-benzoyl-4-piperidone, 1-benzyl-2-pyrrolidinone, 1-cyclohexyl-2-pyrrolidinone, 1,1-diphenyl acetone, 1,1-diphenylethyl ene, 1,2-dibenzoylbenzene, 1,3-diphenyl acetone, 1,3-diphenoxy benzene, 4-acetylbiphenyl, 2-biphenylcarboxylic acid, 4-biphenylcarboxilic acid, 1,2,3-triphenylbenzene, 1,3,5-triphenylbenzene, 1,3-diphenylacetone, 1,4-dibenzoylbutane, 1-benzyl-2-pyrrolidinone, 1-bromonaphthalene, 1-chloronaphthalene, 1-cyclohexyl-2-pyrrolidinon, 1-ethoxynaphthalene, 1-methoxynaphthalene, 1-methyl-2-pyrrolidinone, 2-methoxynaphtalene, 1-phenyldecane, 1-phenylnaphthalene, 1-phenyl-2-pyrrolidinone, 2,4,6-trichlorophenol, 2,5-diphenyloxazole, 2,5-diphenyl-1,3,4-oxadiazol, 1,8-dichloroanthraquinone, 2,6-dimethoxynaphthalene, 2,6-diphenylphenol, 2,7-dimethoxynaphthalene, 2-benzoylnaphthalene, 2-methoxynaphthalene, 2-phenoxybiphenyl, 2-phenylphenol, 3-phenoxybenzyl alcohol, 4,4'-dibromobiphenyl, 4,4'-dihydroxybenzophenone, 4,4'-dimethoxybenzophenone, 4,4'-diphenylbenzophenone, 4,4'-isopropylidenediphenol, 4-benzoylbiphenyl, 4-bromobiphenyl, 4-bromodiphenyl ether, 4-phenylphenol, 5-chloro-2-benzoxazalone, 9-phenylanthracene, 9,10-dichloroanthracene, 9,10-diphenylanthracene, 9,9'-bifluorene, 9-fluorenone, anthracene, benzophenone, benzil, bibenzyl, bis(4-chlorophenyl sulfone), butyl stearate, cyclohexyl phenyl ketone, dibenzothiophene, dibenzoylmethane, diethylene glycol dibutyl ether, dimethyl phthalate, dioctil phthalate, diphenyl carbonate, diphenyl chlorophosphate, diphenylmethyl phosphate, diphenyl phthalate, diphenyl sulfone, diphenyl sulphide, diphenyl sulfoxide, 2,5-diphenyl oxazole, diphenic acid, docosane, dotriacontane, ε-caprolactam, fluoranthene, fluorene, HB-40™, hexadecane, m-terphenyl, methyl myristate, methyl stearate, mineral oil, N,N-diphenylformamide, o,o'-biphenol, o-terphenyl, pentachlorophenol, pentafluorophenol, phenanthrene, phenothiazine, phenyl benzoate, polyphosphoric acid, pyrene, p-terphenyl, Santowax R™, sulfolane, tetraethylene glycol dimethyl ether, tetaphenylenethylene, tetraphenylmethane, tetraphenylsilane, Therminol 66™, Therminol 75™, thianthrene, triphenylene, triphenylmethane, triphenylmethanol, triphenyl phosphate.

As examples, especially useful solvents for PTFE are decafluorobiphenyl, octafluoronaphthalene, perfluorotetradecahydrophenanthrene, perfluoroeicosane, perfluoroperhydrob enzylnaphthalene, perfluorotetracosane, perfluoro-1-methyldecalin, PP11, $C_{14}F_{24}$ oligomers.

It should be noted that dissolution of these polymers in procedure B may require relatively high temperatures, for example 203° C. for PPS in 1-methyl-2-pyrrolidinone. Relatively thereto, the procedures A) and C) above are advantageous in that they can be carried out at room temperature. In comparison, the mixing procedure C) has another advantage compared to the procedure A), namely improved distribution of polymer particles between the dried powdered ECFs.

The structuring of the separator plates in the press-form includes the potential forming of a flow pattern, for example channels for flow of hydrogen fuel, oxygen-containing gas, or coolant, for example liquid coolant, such as water, triethylene glycol (TEG), or silicone oil.

After the moulding, typically, no further structuring by machining of the separator plate is necessary.

For example, the method comprises moulding the sheet into a bipolar plate with a flow channel pattern on each side of the bipolar plate. Alternatively, MPPs are produced and two of such MPPs combined back-to-back into a single BPP.

Optionally, the separator plates are arranged as an array with fuel cell membranes between the separator plates, the membranes separating the hydrogen fuel from the oxygen gas.

The production method is not only suitable for BPPs, for example provided by combining two MPPs. It applies equally well to other separator plates, such as cathode plates, anode plates and cooling plates.

The invention is especially useful for fuel cells, particularly for high temperature proton exchange membrane (HT-PEM) fuel cells, but it could be also used for other electrochemical energy storage and conversion devices, for example, batteries, double-layer capacitors or electrolyzers.

Advantages of the invention comprises a number of advantages, including
- the fibrillization of the polymer by kneading at a temperature above the glass transition temperature in viscous but not molten state;
- the influence of the calendering on PTFE;
- a continuous production process;
- a recycling process.

It is pointed out that the patent application WO2018/072803 discloses Carbon/PTFE/PSS as a possible composition. However, as described therein, the powder sludge is compacted and not kneaded first. Especially, the fibridization of PTFE is not discussed in WO2018/072803.

In some aspects, the method for producing a separator plate comprises mixing an electrical conductive filler ECF in powder form with a first thermoplastic polymer and a second thermoplastic polymer, wherein the first thermoplastic polymer has a tensile elongation less than 100%, for example in the range of 4-100%, and the second thermoplastic polymer has a tensile elongation above 300%, for example in the range of 100% to 300%, and kneading the mix at a temperature above the glass transition temperatures of the polymer of the second group TP2 but below the melting temperature and causing fibrillation of the polymer of the second group TP2 by the kneading.

It is pointed out that all stated percentages for concentrations and amounts are percentages by weight (wt %).

SHORT DESCRIPTION OF THE DRAWINGS

The invention will be explained in more detail with reference to the drawing, wherein FIG. 1 is a schematic image of fuel cell stack;

DETAILED DESCRIPTION/PREFERRED EMBODIMENT

Figure 1:
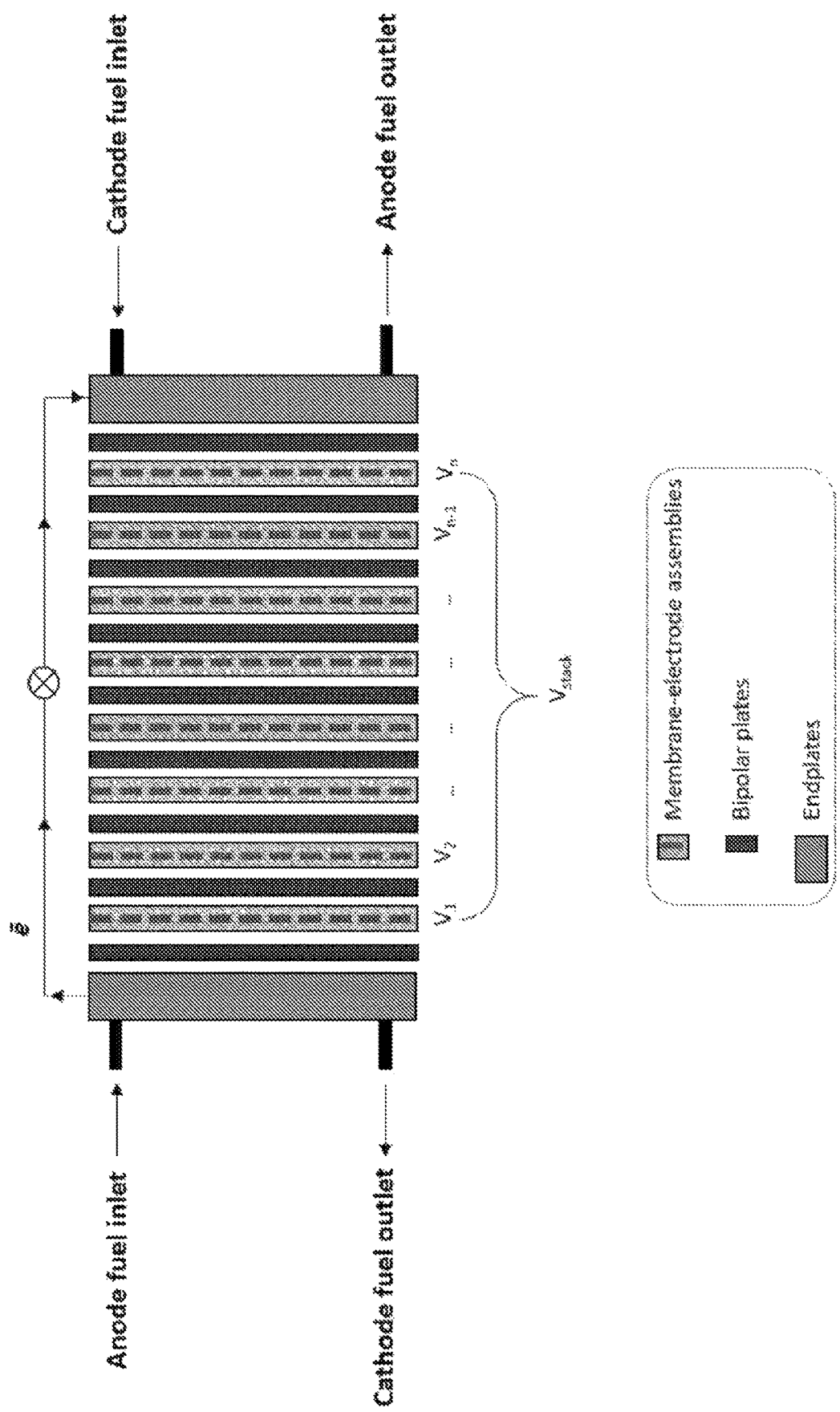

Bipolar plates (BPPs) are one of the key components of fuel cells, as they play role of separators for single membrane-electrode assemblies electrically connecting them serially for providing the required voltage of the stack, as Vstack=V1+V2+ . . . +Vn−1+Vn, which is also illustrated in FIG. 1.

Fuel containing hydrogen is supplied through the anode fuel inlet, and oxygen is supplied through the cathode fuel inlet. The hydrogen and oxygen combine to water, which is dispensed through the cathode fuel outlet, whereas remaining hydrogen is removed through the anode fuel outlet, for example for being used in a burner that is used in combination with a reformer in order to provide energy for the reforming process.

Figure 2:
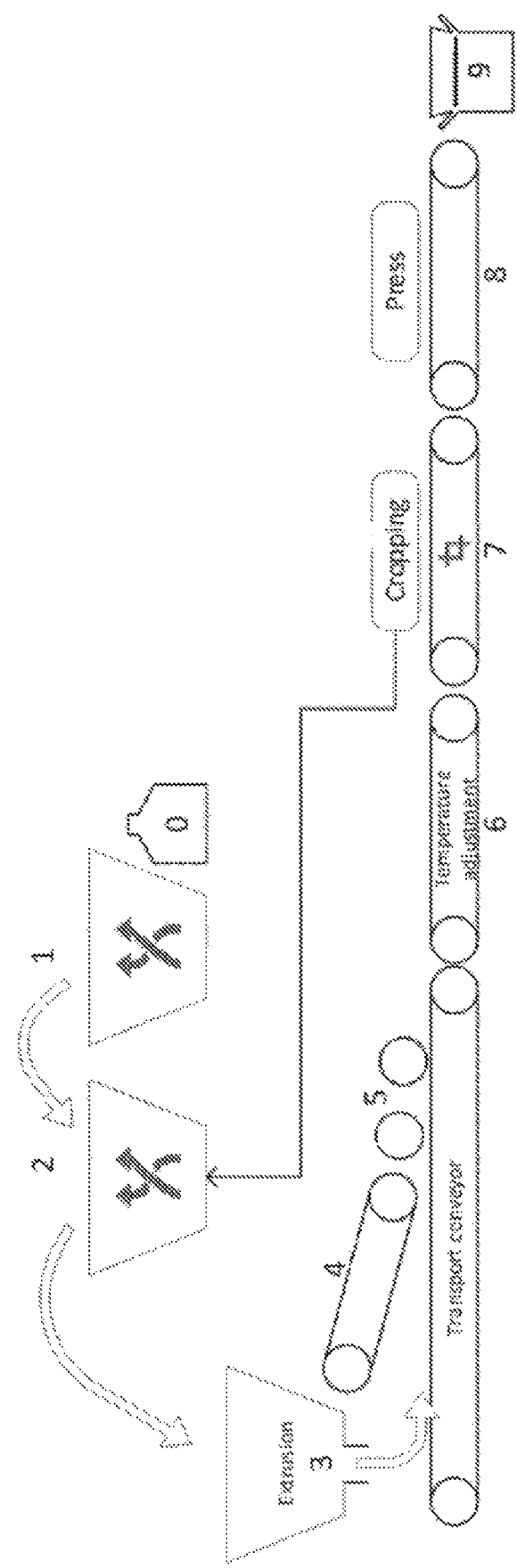
FIG. 2 illustrates a production process.

FIG. 2 exemplifies a continuous process for production of separator plates, for example MPPs or BPPs for the case that two polymers are combined with carbon as ECF in a compound. However, the described method can be generalized to more than two polymers, and the principles apply equally well.

Especially two groups of polymers TP1 and TP2 are described, where a first for the combination of two polymers is taken from group TP1 and the second polymer is taken from TP2. The group of TP1 are polymers that have a high degree of thermal stability, chemical resistivity and good flexural strength. Examples include polyphenylene sulfide (PPS), polyether ether ketones (PEEK), polyetherimide (PEI), polysulfones (PSU). The group of TP2 are polymers that have relatively high tensile elongation, and advantageously also can be fibrillated, especially by kneading. Examples include fluorinated ethylene propylene (FEP), polychlorotrifluoroethylene (PCTFE), polytetrafluoroethylene (PTFE).

In a mixing stage 1 of the process, raw materials are provided from a dispenser 0 and mixed in a mixer, typically by stirring. For this process, different possibilities exist. Non-limiting examples of mixing procedures are as follows:

A) a powder of electrical conductive filler (ECF) in mixed with a powder of a first thermoplastic polymer of the first group TP1 and a second thermoplastic polymer of the second group TP2;

B) a powder of electrical conductive filler (ECF) in mixed with a solution of first thermoplastic polymer of the first group TP1 and a second thermoplastic polymer of the second group TP2;

C) a powder of electrical conductive filler (ECF) in mixed with a dispersion containing a first thermoplastic polymer of the first group TP1 and a second thermoplastic polymer of the second group TP2.

Optionally, the procedures can be combined.

Notice that the procedure B) can be substituted by procedure B1) in which a powder of electrical conductive filler (ECF) in mixed with a solution of first thermoplastic polymer of the first group TP1 and with a powder of a second thermoplastic polymer of the second group TP2; or the procedure B) can be substituted by procedure B2) in which a powder of electrical conductive filler (ECF) in mixed with a powder of a first thermoplastic polymer of the first group TP1 and with solution of a second thermoplastic polymer of the second group TP2.

The different methods A), B), and C) described herein have different advantages and disadvantages when compared, which will be discussed in greater detail, below.

Examples of ECF are amorphous carbon, carbon black, carbon fibers, carbon nanotubes, graphene and/or graphite. For example, the ECF comprises a dominant concentration of graphite and/or carbon black. Typically, the size of the grains in the carbon black powder is in the sub-micron range, for example with an average size of between 20 and 100 nm. For graphite powder, the average grain size is in the range of 0.1 to 20 microns, typically however, in the range of 0.25 to 5 microns. When carbon black is used, optionally, carbon fibers, carbon nanotubes or graphene is added, typically in minor quantities.

It should be noted that dissolution of these polymers in procedure B) requires relatively high temperatures. In contrast thereto, the procedures A) and C) above are advantageous in that they can be carried out at room temperature.

For the procedure C with the particles dispersed in water, examples of useful products includes the raw 10 wt. % aqueous dispersion of PPS from Toray and 60 wt. % aqueous dispersion of PTFE from DuPont. Details for these products are given on the Internet: https://www.toray.jp/chemical/en/polymer/pdf/catalog_pol01en.pdf http://www2.dupont.com/Teflon_Industrial/en_US/assets/downloads/k15764.pdf In the procedure C, the water acts as a delivery agent for providing polymer, optionally sub-micron sized polymer, from the group TCP1 and/or TCP2 to the surface of the ECFs. Advantageously, surfactants in their role as wetting agents are added to these kinds of dispersions and play roles as a bridge for helping polymer nanoparticle to penetrate deeper into pores and cracks of the ECF.

Examples of surfactants are Tergitol™ 15-S Series from Dow Chemicals®, Tween® Series from Croda International®, Triton® X Series from Union Carbide Corporation®. Triton X-100™ from the Triton X Series is nonionic and has a hydrophilic polyethylene oxide chain and an aromatic hydrocarbon lipophilic or hydrophobic group. The hydrocarbon group is a 4-phenyl group. The formula is $C_{14}H_{22}O(C_2H_4O)_n (n=9-10)$. It is commercially available from Sigma Aldrich®.

In order to reduce the content of water in the dispersion of procedure C, the dispersion is stirred in the mixing stage 1 while the temperature increases until the boiling point of the water. The evaporated water is collected afterwards in a tank and cooled down in order to be used again in subsequent stirring processes of next batches. The recovery and recycling of the distilled water reduces costs as compared to discarding water and supply new water because water involves costs that are not negligible due to its required purity.

The recovery of the evaporated liquid from the mix is the more important for the method B, where solvents are used for dissolving the TP1 and/or TP2. In this case, the provision of solvents implies substantial costs. Furthermore, the recovery and recycling of the solvent also is environmentally friendly. An advantage of the process B) is that the dissolved polymers penetrate even deeper into pores and cracks when contacted with the dissolved TCP1 and/or TCP2. A disadvantage is the necessity to use relatively high temperature for dissolution and for removing solvent from the ECFs/TP1/TP2 mixture. Moreover, some of these solvents are toxic, which may complicate large-scale production.

However, it should be pointed in general comparison with prior art methods, that the temperatures required to operate with these high boiling point solvents in procedure B) are significantly lower than temperatures applied in the continuous production of exfoliated graphite for separator plates, namely 700-1050° C.

Although, the use of high-boiling solvents is possible in the process B), the operation with deionized water in process C) is typically preferred.

After the stirring stage 1 in a stirring container, the ECFs/TP1/TP2 mixture is subject to a kneading stage 2 of high-temperature kneading in a kneading container. The aim of this kneading operation is the fibrillization of the polymer of group TP2. The temperature should be above the glass transition temperatures of the polymer of group TP2 in order to achieve fibrillization. The increase of temperature has a positive effect until reaching the melting point of one of the polymers of TP1 or TP2 because polymers at melted condition flow too rapidly. It has turned out that this is less useful as it leads to increased areal specific resistance of the produced BPPs.

The kneading is done or a time sufficiently long to cause substantial fibrillization in the polymer. The time depends on the kneading process. Typical kneading times are in the range of 1-60 minutes.

For the example of PTFE, the temperatures must be higher than 130° C. in order to reach the glass transition temperature of PTFE, where it is in the viscous state. In the case of a graphite/PPS/PTFE compound, the temperature should be lower than the melting temperature of PPS, which is 274° C.

After kneading the heated ECF/TP1/TP2 compound in the kneading stage 2, for example graphite/PPS/PTFE compound, it is subject to and extrusion stage 3, where it is extruded as a pliable and malleable material from an extruder. The compound passes through an extrusion nozzle to form an extruded compound rod, for example with rectangular cross section. Advantageously, this is done relatively fast, for example at a speed in the range of 0.1 to 1 m/s, such as 0.25 m/s.

The extruded rod is transported on a conveyor belt into a first compression stage 4. Such first compression stage 4 is exemplified as an inclined top-pressing conveyor with decreasing height in the direction of transportation such that the height of the rod is decreased by its way through compression stage 4. This single operation can be used to quickly reduce the height of the rod, while the width is increased.

Optionally, a calendering stage 5 is added with calendering stations with decreasing gap height in subsequent calendering stations to form a relatively thin sheet with a requested final thickness. Advantageously, the thickness of the rod when transformed into a sheet is decreased to less than 2 mm, optionally to less than 1 mm. For example, the gaps between calendering rolls results in a reduction of 50% in height of the ECP/TP1/TP2 compound after each station. The number of such width-reducing calendering stations depends on the initial thickness of the rod and the final thickness of the sheet, which optionally is less than a mm, and can be made as thin as a few tenths of a mm. During this calendering stage 5, nano-fibril formation is further enhanced, for example in PTFE. For PPS, fibrillization is not occurring, as already discussed above.

Due to a difference in the parameters and characteristics for TP1 relatively to TP2, as outlined above, their relative concentration in the compound are different, typically more TP1 than TP2.

Figure 3:
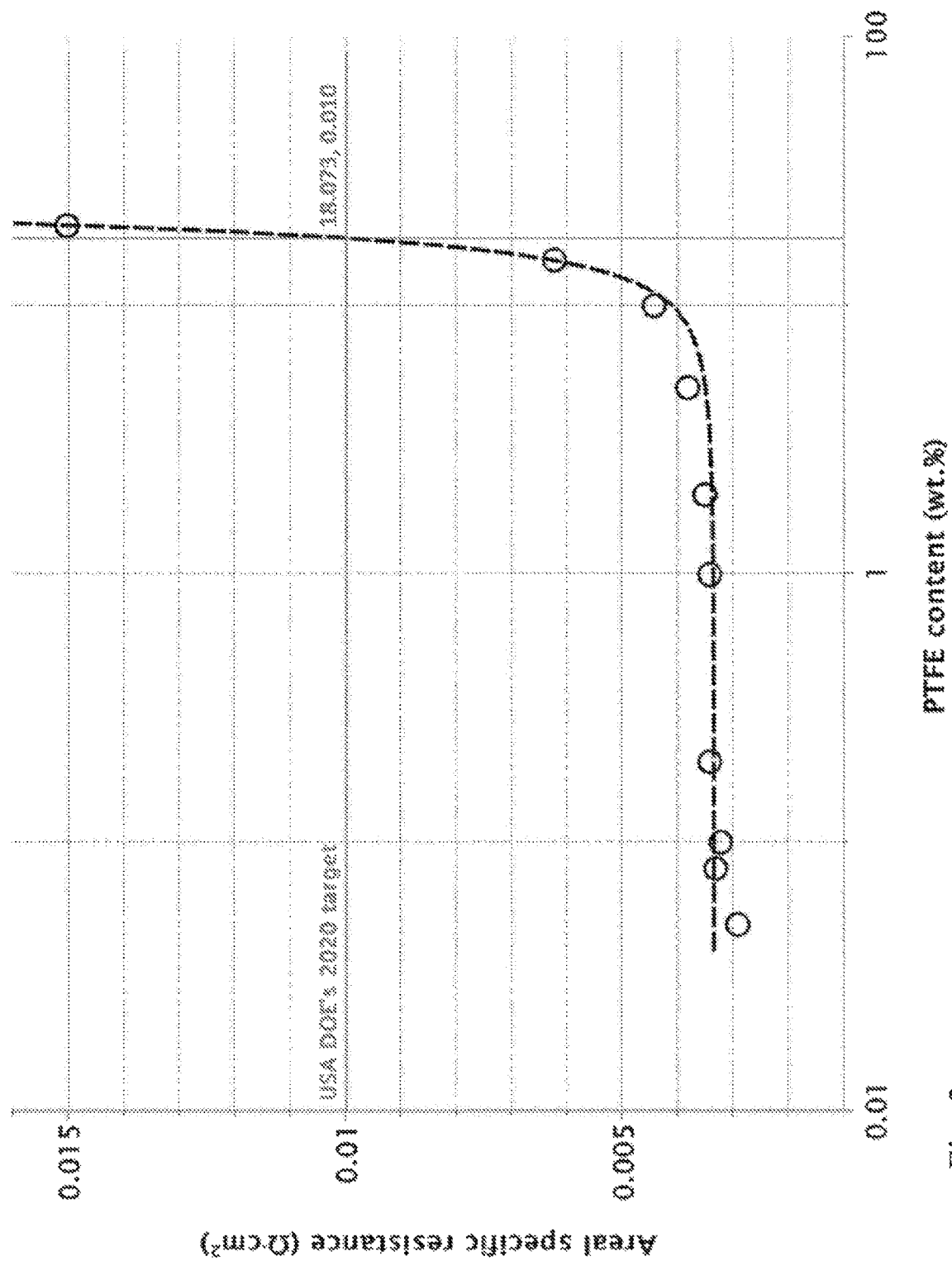
FIG. 3 is a graph illustrating areal specific resistance of a separator plate in dependence of the PTFE content.

A useful example as an upper limit for PTFE is 18 wt. %, which corresponds USA DOE's 2020 target for areal specific resistance. This is illustrated in FIG. 3, showing the dependence of the electrical properties depending on PTFE content in the composition of BPPs.

The PTFE concentration also has influence on the BPP thickness when having the DOE target in mind. For example, in order to reach the targeted value, the thickness of BPPs reduces with increasing PTFE content, namely from 0.84 mm for BPP with 0.05 wt. % to 0.18 mm for BPP with 18 wt. % PTFE. In these examples, the PPS content is fixed at the level of 20 wt. %.

In practical cases, the PTFE content is typically much lower than 18 wt. %, for example lower than 0.5 wt. %. Although, the addition of polymer of TP2, such as PTFE, improves plasticity, which is advantageous, it implies the disadvantage of resulting in lower electrical conductivity. For example, the ratio by weight between polymers of the two groups TP1:TP2 is higher than 20, and in some cases even up to 400, the latter being the case for PPS:PTFE being 20:0.05 wt %. An example of such compound mixture is, apart from the ECF, is 20 wt. % PPS and 0.05 wt. % PTFE. The carbon content in this case is almost 80%. However, the mix may also contain a surfactant, and the carbon content being correspondingly lower.

Typically, the carbon content in the compound is above 70% for proper desired conductivity.

With reference to FIG. 2, the temperature of the ECF/TP1/TP2 film is adjusted in stage 6, for example by adjusting the temperature of the conveyor surface and assuring that there is thermal conduction between the conveyor surface and the sheet.

Subsequently, the sheet is truncated into required dimensions in a corresponding station 7, for example cut in a cutting station 7, typically by a knife. Optionally, the scrap is returned to the container in stage 2 in order to be recycled in the fabrication process. In this case, the yield with respect to use of start-material can be very close to 100%.

In press-moulding stage 8, hot compaction or compression moulding is provided in a press-form. For example, in case PPS is used as polymer from TP1, the hot compaction in the press-form of stage 8 is done at an initial temperature between 220° C. and 274° C. A useful applied pressure is between 75 and 375 MPa, but can be lower, especially at higher temperature, for example at temperatures up to 400° C. An advantage of hot compression is a short press-moulding time, which optionally is shorter than 1 second.

For example, during hot compaction or compression moulding, the density of the pressed material increases more than 2 times.

As an option, the press-form used in press-moulding stage 8 is also used to cool down the separator sheet. In this case, the available time for shaping the separator plate is limited by the speed by which the sheet is cooled down, as the shaping by press-moulding should be finished before reaching the glass transition temperature of the polymers in the sheet, which as an example is 85° C. for PPS. A quick press-moulding procedure is beneficial in that the product can be pressed into its desired and final shape before the glass temperature is reached of one or more polymers in the compound.

Additionally, quick cooling down of the sheet during press-moulding has an advantage of speeding up the production process, in general. In order to realize high-speed hot-compaction or compression moulding while at the same time cooling the formed sheet down within short time, materials for the press-form are provided with high thermal conductivity in order to take out heat and thereby cooling down the pressed MPPs as fast as possible. Examples of such materials that have are molybdenum, tungsten and some aluminum alloys like 2024-T351, 7075-T651 that have thermal conductivities of, respectively, 143, 197 121, and 130 W/(m·K).

Figure 4:
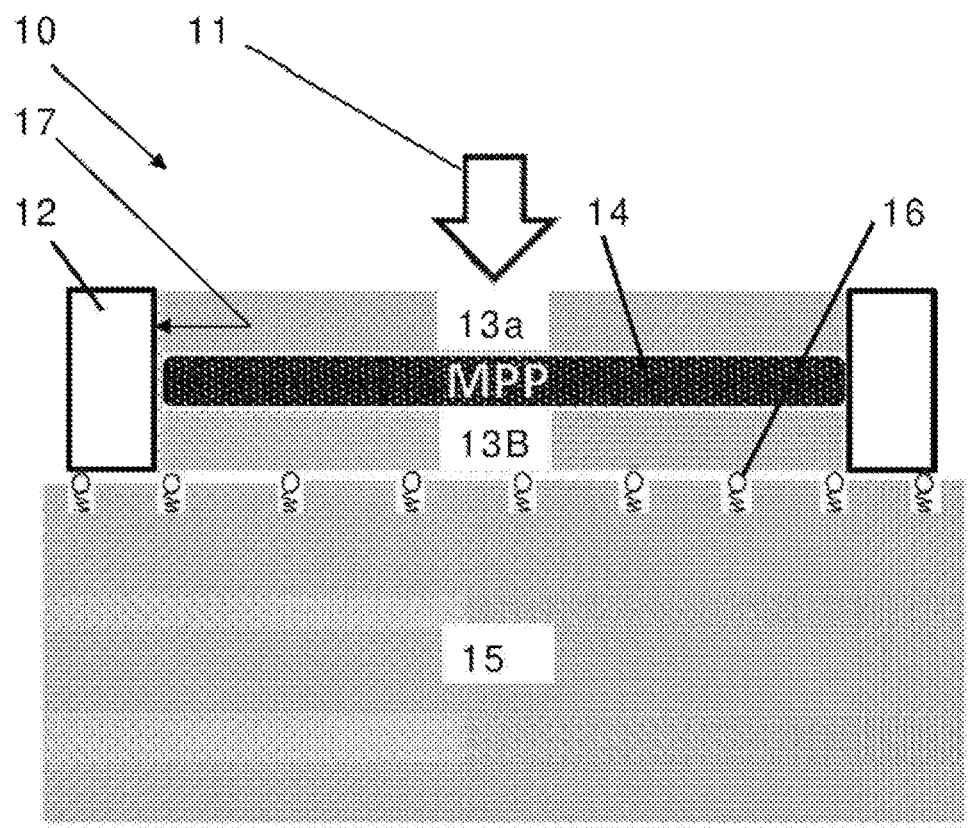
FIG. 4 is a sketch of an exemplified press-form.

An example of a press-form 10 for the press-moulding stage 8 is illustrated in FIG. 4. The polymer sheet 14, for example an MPP, is inserted between to shaping press-plates 13a, 13b which are compressed by force 11 against a counterblock 15. The two press-plates 13a, 13b are supported by a support frame 12. As an option, elastic elements 16, such as springs, are provided between the shaping plates 13a, 13b and the counterblock 15 in order to prevent overload to the press-plates 13a, 13b and the sheet 14 and for allowing a gradual shaping of the sheet 14 into an MPP despite high speed press-moulding.

The produced MPPs cover the walls of press-form 10 during the press-moulding action. The reduction of the thickness of the carbon-containing sheets in the pre-shaping sections 4 and 5 of the continuous process before the pressing process in the press-moulding stage 8 assures a smooth continuous process and minimizes risk for damage to the sheet as well as to the press-form, including scratches on the inner part of press-form.

It has been found that the use of materials with different hardness for the various components of the press-plates 13a, 13b and the support frame 12 are advantageous. Especially, it has been found advantageous to use a lower hardness for the support frame 12 as compared to the press-plates 13a, 13b.

The advantage of the different hardness is minimization of scratching of the press-plates 13a, 13b of the support frame 12 during their working contact. It is pointed out in this connection that the press-plates 13a, 13b need to be highly rigid and stable in order for the separator plate 14 to attain the correct dimensions and shape. For this reason, the press-plates 13a, 13b have to be made in a hard material. Also, in order to prevent escape of material from the press-form 10, the press-plates 13a, 13b need to be tightly abutting the inner wall 17 of the support frame 12. This tight abutment implies a risk for scratching of the inner wall 17 of the support frame 12. It has been found that the risk for creation of surface scratching between the press-plates 13a, 13b at their rim and the surrounding support frame 12 is minimized if the hardness between the press-plates 13a, 13b and the support frame 12 differs. However, as the press-plates 13a, 13b need to have a high hardness, the difference in hardness is most advantageously achieved with a support frame 12 having a hardness that is lower than for the plates, or by having a lower hardness at least for the inner wall 17 of the support frame 12, where the press-plates 13a, 13b are abutting the inner wall 17.

Useful examples of materials for the press-plates 13a, 13b and optionally also for the counterblock 15, are molybdenum, tungsten and some aluminum alloys like 2024-T351, 7075-T651, having a hardness of 225, 294 and 120, 150, respectively, according to Brinell method. Useful materials for the support frame 12 are softer materials, for example bronze, with Brinell's hardness of 166. or other aluminum alloys (6061-T651, 2011-T3) with Brinell's hardness of 95, which is much lower.

In order to speed up production, the time for the sheets before applying the pressure should also be minimized. For this reason, the sheet material, in particular the ECF/TP1/TP2 film, should move on the conveyor fast. In order to minimize heat loss of the polymer, the material of the rollers of the conveyor should have low thermal conductivity. For this reason, polymer rollers have been found advantageous. A useful example of a material for the rollers is PEEK, with a thermal conductivity of 0.25 W/(m·K).

The use of polymer rollers has also another benefit compared to conventional metal rollers, namely high anti-sticking properties, especially at elevated temperatures. For example, PEEK has a relatively high continuous service temperature of 260° C., making it a suitable candidate for the compound of PSS/PTFE.

In case that the production method is used for producing MPPs, these are collected, for example in a container 9, as illustrated in FIG. 2.

From that stage, the MPPs can be used for pair-wise assembly into BPPs, if BPPs are desired as final product. A typical assembly method includes gluing around the perimeters of two MPPs in back-to-back abutment. The requirements for the glue utilized for PEM BPPs are very similar to the polymers used in the MPP compound, i.e. mechanical, thermal and chemical stability within the working temperature range of high-temperature PEM fuel cell. It should be mentioned that forming BPPs by the process described here allows to get gas flow channels and portholes in one run, so no additional operations like milling are needed.

Some mechanical and electrical properties of the ECF/TP1/TP2 sheets and BPPs based on a graphite/PP S/PTFE compound are given in Table 2. The data presented in this table were obtained from the graphite-containing sheets with 20 wt. % PPS and 0.05 wt. % PTFE. The compound was mixed by adding an aqueous PTFE dispersion to a dry powder graphite/PPS mixture. BPPs were formed with such polymer composition by applying a pressure of 275±25 MPa and with 265±5° C. as initial temperature. As it appears from Table 2, the mass density increased by a factor of 2 to 3 by the compression, while the thickness was reduced by a corresponding factor. The flexural strength is within the requirements for the DOE 2020 target.

TABLE 2

Mechanical and electrical properties of some sheets and BPPs based on graphite/PPS/PTFE compound

|  | Sheets | BPPs |
| --- | --- | --- |
| Density (g/cm$^3$) | 0.76-0.87 | 2.05-2.12 |
| Thickness (mm) | 1.25-1.75 | 0.55-0.80 |
| Tensile elongation (%) | 14-16 | N/A |
| Shrinkage (%) | 1.5-2.0 | N/A |
| Flexural strength (MPa) | N/A | 25-45 |
| Areal specific resistance ($\Omega \cdot cm^2$) | N/A | 0.0029-0.0034 |

As a conclusion, the presented production method implies a fast, continuous and waste-free method for production of separator plates, especially BPPs, which are suitable for use in high-temperature PEM fuel cells.

Main advantages of the process relatively to the prior art are:
1) possibility to re-use ECF/TP1/TP2 sheets with defects or scrap after the cutting stage;
2) no easy-flammable substances used in the production, especially no use of isopropanol; only water or high-boiling solvents used in production;
3) avoidance of iso-propanol minimizes the risk for agglomeration of polymer nanoparticles and therefore better distributes the particles inside the compound;
4) no necessity to have an extra-stage with filtering and vacuum drying of the compounded film and/or sheets from liquids;

5) due to minimized heat losses via the use of polymer rolls and minimized sticking problems via operation at temperatures below melting points of polymers from TP1 and TP2, a very high speed of production is achieved;

6) a continuous process that helps avoiding long-term storing of the sheets, which would require a room with special requirements regarding temperature and humidity due to its high porosity of approximately 40%;

7) minimization of the problem with shrinkage of the sheets, which can reach 2%, as the sheets are transported to the press-form at the same temperature as they are calendered;

8) extremely short time for hot compaction or compression moulding that is achieved due to the a special design of the press-form as well as the utilization of thin pre-compacted graphite-based sheets as blanks for MPPs and the use of non-stick additive (PTFE as TP2) in the sheet's composition.

The invention claimed is:

1. A method of producing a separator plate, the method comprising:
    in a mixing stage mixing thermoplastic polymer material and a powder of electro-conductive filler, ECF to form a mix;
    in a subsequent kneading stage kneading the mix at a kneading temperature above a glass transition temperature for the thermoplastic polymer material but below a melting temperature for the thermoplastic polymer material in order to provide a malleable but not molten compound; kneading the compound for a kneading time at the kneading temperature to cause fibrillization in the thermoplastic polymer material;
    in a subsequent pre-pressing stage after the kneading stage pre-pressing the malleable compound into a sheet;
    in a hot press-moulding stage after the pre-pressing stage hot-compacting the sheet in a press-form to form a separator plate at a press-moulding temperature above the glass transition temperature for the thermoplastic polymer material but below the melting temperature for the thermoplastic polymer material in order to compact the compound in malleable but not molten state;
    reducing the press-moulding temperature of the formed separator plate to under the glass transition temperature for the thermoplastic polymer material while under pressure in the press-form to cause rigid solidification, and then removing the rigidly solidified separator plate from the press-form.

2. The method according to claim 1, wherein the method comprises:
    selecting at least two thermoplastic polymers, wherein the at least two thermoplastic polymers have glass transition temperatures and melting temperatures, wherein the highest of the glass transition temperatures for the at least two thermoplastic polymers is below the lowest of the melting temperatures for the at least two thermoplastic polymers; wherein at least one of the at least two thermoplastic polymers is fibrillizable by kneading;
    in the mixing stage providing the thermoplastic polymer material as a mix of the at least two thermoplastic polymers and mixing the at least two thermoplastic polymers with the ECF;
    in the kneading stage adjusting the temperature of the mix to a kneading temperature that is above the highest of the glass transition temperatures for the at least two thermoplastic polymers but below the lowest of the melting temperatures for the at least two thermoplastic polymers in order to knead a malleable but not molten compound; and kneading for a kneading time at the kneading temperature to cause fibrillization in at least one of the at least two thermoplastic polymers;
    in the hot press-moulding stage, adjusting the press-moulding temperature to above the highest of the glass transition temperatures for the at least two thermoplastic polymers but below the lowest melting temperature for the at least two thermoplastic polymers; and reducing the temperature of the formed separator plate to under the lowest of the glass transition temperatures for the at least two thermoplastic polymers while under pressure in the press-form to cause rigid solidification of all of the at least two thermoplastic polymers prior to removing the rigidly solidified separator plate from the press-form.

3. The method according to claim 1, where in the method comprises a continuous sequence of production stages, the continuous sequence comprising in the following order:
    the kneading stage of the compound;
    in an extrusion stage extruding the compound after the kneading;
    the pre-pressing stage for pre-pressing the extruded compound into a sheet;
    shaping the sheet into desired dimensions for the separator plate;
    moving the shaped sheet into the press-form and hot-compacting the sheet in the hot press-moulding stage and cooling the sheet to under the glass temperature of the thermoplastic polymer while the sheet, after forming of it into a separator plate, remains in the press form, and then removing the separator plate from the press-form.

4. The method according to claim 3, wherein the extrusion stage comprises extruding the compound onto a conveyor; and wherein the pre-pressing stage comprises pre-pressing the extruded compound into a sheet while the sheet is being moved on the conveyor, the pre-pressing stage comprising at least one of A) and B), wherein
    A) is a first compression stage that is decreasing the height of the extruded compound by an inclined top-pressing conveyor with decreasing height in the direction of transportation such that the height of the extruded compound is decreased by its way through top-pressing conveyor; and wherein
    B) is a calendering stage comprising press-rolling the extruded compound by multiple subsequent calendering stations with decreasing gap height in subsequent calendering stations such that the height of the extruded compound is decreased by its transport through each of the gaps of the calendaring stations.

5. The method according to claim 3, wherein the shaping of the sheet into desired dimensions for the separator plate comprises removal of surplus-material from edges of the sheet, for example by cutting in a cutting stage, and wherein the method comprises recycling the removed surplus-material into the mixing stage or into the kneading stage for production of subsequent separator plates.

6. The method according to claim 1, wherein the mixing stage comprises mixing the ECF powder as dry powder with a dry powder of thermoplastic polymer, and wherein the kneading stage comprises kneading the mixed dry powder into the compound at the kneading temperature.

7. The method according to claim 1, wherein the mixing stage comprises mixing the ECF powder with a solution of thermoplastic polymer in a solvent, and heating the mix to a temperature above the boiling point of the solvent, causing evaporation of the solvent while stirring the solution, and wherein the kneading stage comprises kneading a remaining mix into a compound after evaporation of the solvent.

8. The method according to claim 7, wherein the solvent is captured during evaporation and recycled in the process for subsequent mixing stages.

9. The method according claim 1, wherein the mixing stage comprises mixing the ECF powder with a water dispersion of a powder of the thermo-plastic polymer material and heating the mix to a temperature causing evaporation of the water while stirring the water dispersion, and wherein the kneading stage comprises kneading a remaining mix into a compound after evaporation of the water.

10. The method according to claim 9, wherein the water is captured during evaporation and recycled in the process for subsequent mixing stages.

11. The method according to claim 1, wherein the method comprises in the prepressing stage pre-pressing the compound into a sheet of a thickness of less than 2 mm thickness.

12. The method according to claim 1, wherein the press-form comprises two oppositely arranged shaping press-plates with a space in between for the sheet, wherein the method comprises providing the press-plates with a thermal conductivity of more than 100 W/(m·K) and causing take-up of thermal energy by the press-plates during press-moulding of the sheet, wherein the take-up of thermal energy is regulated to a speed causing cooling to below the glass temperature of the separator plate during press-moulding and rigid solidification of the separator cooling within a time of less than two seconds.

13. The method according to claim 1, wherein the method comprises, in the hot press-moulding stage, press-moulding the sheet by the press-form at a pressure of between 75 and 375 MPa and cooling it down by transfer of thermal energy to the material of the press-form for causing rigid solidification within a time in the press-form of less than two seconds.

14. The method according to claim 1, wherein the method is free of isopropanol.

15. The method according to claim 2, wherein the thermoplastic polymer material comprises a first group TP1 of thermoplastic polymers and thermoplastic polymer of a second group TP2 of thermoplastic polymers, wherein both groups TP1 and TP2 have melting points above 200° C., wherein the first group TP1 comprises polymers that have a tensile elongation of less than 100% and a flexural strength higher than 100 MPa, and wherein the second group TP2 comprises polymers that have a tensile elongation of at least 100% and which are fibrillizable by kneading at the kneading temperature, wherein the compound comprises more polymer of the first group TP1 than polymer of the second group TP2, and wherein a concentration of ECF in the compound is more than 60% of the weight of the compound.

16. The method according to claim 15, wherein the first group TP1 comprises poly-phenylene sulfide (PPS), polyether ether ketones (PEEK), polyetherimide (PEI), poly-sulfones (PSU), and wherein TP2 comprises ethylene tetrafluoroethylene (ETFE), fluorinated ethylene propylene (FEP), polychlorotrifluoroethylene (PCTFE), polytetra-fluoroethylene (PTFE).

17. A production facility for practicing the method according to claim 1, the production facility comprising a press-form with two oppositely arranged shaping press-plates with a space in between for the sheet, wherein the press-plates are made from a material with thermal conductivity of more than 100 W/(m·K) in order to minimize time for taking up heat from the sheet during press-moulding.

18. The production facility according to claim 17, wherein the two press-plates are supported by a support frame and abutting an inner wall of the support frame, wherein the inner wall of the support frame is made of a material with a lower hardness than the material of the press-plates for minimizing risk for scratches between the press-plates and the inner wall of the support frame.

19. The production facility according to claim 17, wherein the press-plates are arranged for being compressed by force against a counterblock having larger volume and mass as the press-plates.

20. The production facility according to claim 19, wherein the press-form comprises elastic elements, such as springs, between the pair of shaping plates and the counterblock in order to prevent overload to the press-plates and the sheet and for allowing a gradual shaping of the sheet into an MPP despite high speed press-moulding.

* * * * *